US007094502B2

(12) United States Patent
Schaefer et al.

(10) Patent No.: US 7,094,502 B2
(45) Date of Patent: *Aug. 22, 2006

(54) METHODS FOR TRANSFERRING HOLOGRAPHIC IMAGES INTO METAL SURFACES

(75) Inventors: Mark W. Schaefer, Knoxville, TN (US); Thomas L. Levendusky, Greensburg, PA (US); Simon Sheu, Murrysville, PA (US); Robert B. Larsen, Maryville, TN (US); Neville C. Whittle, Pittsburgh, PA (US)

(73) Assignee: Alcon Inc., Pittsburgh, PA (US)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 986 days.

(21) Appl. No.: 09/473,246

(22) Filed: Dec. 27, 1999

(65) Prior Publication Data

US 2002/0090578 A1 Jul. 11, 2002

Related U.S. Application Data

(63) Continuation-in-part of application No. 09/166,974, filed on Oct. 6, 1998, now Pat. No. 6,006,415, which is a continuation-in-part of application No. 08/991,101, filed on Dec. 12, 1997, now Pat. No. 5,881,444.

(51) Int. Cl.
 B21B 45/02 (2006.01)
 G03H 1/04 (2006.01)
(52) U.S. Cl. ............... 430/1; 430/2; 430/321; 430/320; 359/1; 359/2; 72/349; 101/32

(58) Field of Classification Search ............... 430/1, 430/2, 321, 320; 359/1, 2; 29/DIG. 37, 29/529.1, 529.2; 72/349; 101/32
See application file for complete search history.

(56) References Cited

U.S. PATENT DOCUMENTS

| 3,048,512 | A | | 8/1962 | Nelson |
| 3,244,094 | A | | 4/1966 | Gresham |
| 3,733,258 | A | | 5/1973 | Hanak et al. |
| 3,875,026 | A | | 4/1975 | Widmer |
| 3,944,420 | A | | 3/1976 | Gale et al. |
| 4,368,979 | A | | 1/1983 | Ruell |
| 4,402,571 | A | * | 9/1983 | Cowan et al. ............... 359/2 |
| 4,478,769 | A | * | 10/1984 | Pricone et al. ............... 264/1.6 |
| 4,684,795 | A | | 8/1987 | Colgate, Jr. |
| 4,725,111 | A | | 2/1988 | Weitzen et al. |
| 4,741,266 | A | | 5/1988 | Stirbis et al. |
| 4,773,718 | A | | 9/1988 | Weitzen et al. |
| 4,856,857 | A | | 8/1989 | Takeuchi et al. |

(Continued)

FOREIGN PATENT DOCUMENTS

FR 2474453 * 7/1981

(Continued)

OTHER PUBLICATIONS

Research Disclosure 290122, Jun. 1988.

(Continued)

*Primary Examiner*—Martin Angebranndt
(74) *Attorney, Agent, or Firm*—Douglas G. Glantz (57) ABSTRACT

A method for impressing holographic images or holograms in the surface of metal objects such as aluminum cans, sheet metal or metal foil. The surfaces of metal shims and print rolls bearing holograms are hardened as by coating them with thin amorphous diamond coatings or diamond like coatings so the holograms can be embossed into many thousands of metal objects with clarity and consistency.

23 Claims, 5 Drawing Sheets

U.S. PATENT DOCUMENTS

| | | | |
|---|---|---|---|
| 4,913,858 A | | 4/1990 | Miekka et al. |
| 4,971,646 A | | 11/1990 | Schell et al. |
| 4,999,075 A | | 3/1991 | Coburn, Jr. |
| 5,000,370 A | * | 3/1991 | Schmidt ..................... 228/157 |
| 5,059,499 A | | 10/1991 | Teitel |
| 5,111,572 A | | 5/1992 | Haiml et al. |
| 5,125,212 A | * | 6/1992 | Smyth ........................ 53/412 |
| 5,193,014 A | | 3/1993 | Takenouchi et al. |
| 5,199,591 A | * | 4/1993 | Thibeault et al. ........... 220/253 |
| 5,227,897 A | | 7/1993 | Fohrman et al. |
| 5,267,753 A | | 12/1993 | Chock |
| 5,327,825 A | | 7/1994 | Parker et al. |
| 5,370,763 A | | 12/1994 | Curiel |
| 5,521,030 A | | 5/1996 | McGrew |
| 5,881,444 A | * | 3/1999 | Schaefer et al. ........... 29/527.1 |
| 5,902,436 A | | 5/1999 | Stepanek |
| 6,006,415 A | * | 12/1999 | Schaefer et al. ........... 29/527.1 |
| 6,017,657 A | * | 1/2000 | Mentz et al. ................... 430/1 |
| 2004/0003638 A1 | * | 1/2004 | Schaefer et al. ............... 72/41 |

FOREIGN PATENT DOCUMENTS

| | | | |
|---|---|---|---|
| JP | | 03-252936 | * 11/1991 |

OTHER PUBLICATIONS

Multi-Arc Scientific Coatings Catalog, "Advanced ION Bond(R) Coatings", no date.

Richard Horsfall, "Amorphous Diamond Shapes Up", *Cutting Tool Engineering*, vol. 49, No. 5, Aug. 1997.

"Tetrabond(R) (Tetrahedral Amorphous Diamond)—Most Commonly Asked Questions", no date.

Bernard F. Coll, Manish Chhlowalla, "Amorphous diamond film by enhanced arc deposition", *Surface and Coatings Technology*, 79 (1996), pp. 76-85.

Glenn Johnson and Oliver Sparkman, "The Future of Small Hole Drilling?", *Drilling Advances*, no date.

"What Is A Diffraction Grating?", The Diffraction Co., no date.

* cited by examiner

METHODS FOR TRANSFERRING HOLOGRAPHIC IMAGES INTO METAL SURFACES

CROSS-REFERENCE TO RELATED APPLICATIONS

This is a continuation-in-part of U.S. patent application Ser. No. 09/166,974, filed Oct. 6, 1998, now U.S. Pat. No. 6,006,415, which was a continuation-in-part of U.S. patent application Ser. No. 08/991,101, filed Dec. 12, 1997, now U.S. Pat. No. 5,881,444.

BACKGROUND OF THE INVENTION

1. Field of the Invention

This invention relates to pressing or engraving holograms and/or diffraction images into metallic surfaces such as metal cans.

2. Description of the Prior Art

It is well known to manufacture a variety of products having holograms or diffraction images pressed or embossed into them. Such products include credit cards, license plates, consumer packaging, pictures, tickets and the like. See, for example, U.S. Pat. Nos. 4,368,979; 4,684,795; 4,856,857; 4,971,646; 4,999,075; and 5,267,753. Holograms generally mean a diffraction pattern which produces a three-dimensional image. Other diffraction images modify the behavior of light that strikes an object bearing the image without creating a three-dimensional appearance. The term "hologram" is used herein in the broad sense to include diffraction patterns or images as well as three-dimensional holograms and other complex images having different planes of diffraction. The manufacture of holograms, shims or plates is well known in the art as disclosed in U.S. Pat. Nos. 3,733,258; 3,875,026; 3,944,420; and 5,059,499, among others.

Most holograms on credit cards and the like are embossed into a plastic sheet material such as Mylar® or other polyester which has a thin underlayer of reflective material such as aluminum to produce a reflective hologram. The aluminum is typically vapor deposited onto the substrate. Holograms can also be impressed into thermoplastic layers on durable substrates as disclosed in U.S. Pat. No. 4,913,858. The coated sheet is heated to soften the coating which is decorated using an embossing member to provide a diffraction pattern or hologram.

It is further known to create embossing tools or roller dies bearing holographic patterns which are impressed into aluminum foil, translucent plastics and other materials, as is disclosed in U.S. Pat. No. 5,521,030. That patent discloses a process in which the holographic pattern is etched directly into a durable surface on the tool or die. The patent states that large quantities of holograms can be made from a single die made of high quality steel, chrome, or the like that is used in the roller die. The patent further states that the die may be a flat plate mounted on a substrate, an inside surface of an injection mold, a mandrel, a casting mold, or other surface used for transferring a relief pattern. The patent states that the holographic pattern may be embossed into aluminum foil, aluminum sheets, steel beverage containers, or the like.

It is also known to emboss holograms directly into the outer surface of sheet metal such as aluminum foil and aluminum beverage cans as is disclosed in U.S. Pat. Nos. 4,773,718 and 4,725,111. Those patents explain that the temperature of the aluminum is important for optimizing the embossing process and that the nickel master plate must be many times less deformable at the embossing temperature than is the material being embossed. The patents describe a process in which the aluminum foil and aluminum cans are heated to reduce the yield strength of the metal. The yield strength of the nickel master is relatively constant over the temperature range in which the yield strength of the aluminum in the foil and cans is dramatically reduced. The patents disclose embossing apparatus having a metal embossing plate carried on the outside surface of a wheel which is pressed against a can mounted on a mandrel. The embossing plate is heated by a heater that may be disposed within the wheel. The machine has a plurality of mandrels for cans which are sequentially embossed. The mandrels are preferably cooled. The process disclosed by these patents has not been used commercially despite the desirability of enhancing the decoration of cans.

Another technique for forming a hologram or diffraction grating in a metal blank or a metal container is disclosed in U.S. Pat. No. 5,193,014. According to that patent, a hologram or diffraction grating is first formed on a gently curved surface of a metal plate mold, followed by stamping the metal blank or can with the plate mold to transfer the hologram.

An improved low cost technique is desired for embossing holograms into metal objects such as metal strip material, metal foil and metal cans. Many billions of aluminum beer and beverage cans are made and sold annually, and improved decoration of such cans would improve their marketability. Aluminum cans are made from hard temper aluminum alloys, and the sidewalls of the cans are quite thin such as in the range of about 0.0038 to 0.0042 inch. The cans are typically filled with carbonated beverages which produce pressures of 90–110 psi or more within the cans. The cans are commonly closed with a lid that is secured on the cans by a double seamer that applies a top load of about 100 to 130 pounds on the can during the seaming operation. It is important that the temper and strength of aluminum cans not be unduly reduced during processing as can happen if the cans are heated.

A technique for embossing or engraving holograms on cans is needed which adds little to the cost of the cans and which produces consistently high quality images. It is desirable for a manufacturing system to be capable of engraving/embossing holograms on approximately 2.5 million cans per day in order to be commercially practicable. Beverage companies and bottlers demand high quality cans and will not accept noticeable variations in the decoration on their cans. Moreover, the commercial can manufacturing and filling processes operate at high speeds of 600 to 2000 cans per minute, and can decoration processes must be statistically in control and capable at such speeds.

A technique is also desired for impressing holograms into sheet or strip metal such as aluminum foil or aluminum sheet material. Aluminum foil is commonly used for wrapping and packaging many products, and the foil may be more attractive for some uses if it has holograms impressed in it.

SUMMARY OF THE INVENTION

The present invention meets the above-described needs by providing a process for producing a master die that can be used to manufacture many thousands of high quality decorated aluminum cans, can ends or other metal products at high speeds. The cost of decorating aluminum cans, can ends or other metal products by this invention is nominal and is economical for mass marketing of the products. This invention can be used for decorating a variety of metal products such as bright metal used in automotive trim, truck panels, truck tool boxes, memory discs, lighting sheet, and metal desks, among other things. It can also be used for decorating metal foil for use in packaging or wrapping of a variety of products.

This invention uses a nickel shim having a holographic pattern in it, which is produced by conventional methods, to manufacture multiple master dies for decorating metallic products. The master die may be in the form of a print roll or flexible sheet metal into which the holographic pattern is transferred. The master die may also be a shim having sufficient surface hardness to transfer a holographic image to hard sheet metal. The master die is made of metal having a suitable hardness relative to the nickel shim in order to make a high quality transfer of the image from the shim to the master die. It is preferred that the nickel shim has a hardness which is at least about 2.5 times the hardness of the material at the surface of the master dies. If a nickel shim is used as a master die, the shim should have a hardness of at least about 2.5 times the hardness of the article to which the image is to be transferred.

Following transfer of the pattern from the shim to the master die or dies, the surface of the dies are hardened as for example by putting an amorphous diamond coating (ADC) or a diamond like coating (DLC) on them. The coating is very thin and of uniform thickness to minimize possible adverse effect on the clarity of the holographic pattern, while being thick enough to provide the requisite hardness for engraving/embossing many thousands of cans, can ends or other articles.

It is an object of this invention to provide a method for engraving/embossing holograms into the exterior surface of metal objects such as cans, can ends, metal sheet, metal foil, or the like.

Another object of this invention is to provide a method for economically engraving/embossing holograms having uniformity and clarity into many thousands of metal cans, can bodies, can ends and other articles with the same dies.

It is also an object of this invention to provide improved dies for engraving/embossing holograms into products made of metal, plastic and other materials.

A further object is to provide a method and apparatus for decorating cans with holograms and decorative coatings at high speeds for mass production of aluminum cans without adversely affecting the mechanical properties of the cans.

Another object is to provide improved hologram-decorated cans, can ends, automotive trim, lighting sheet, memory discs, polished tool boxes, truck trailer sheet or panels, metal desks, key chains, business cards, foil, and other metal and non-metal products.

Yet another object is to provide a method for producing print rolls having holographic images on them which are suitable for engraving/embossing hundreds of thousands of metal articles such as steel or aluminum cans, can ends or other metal products.

The above and other objects and advantages of this invention will be more fully understood and appreciated with reference to the attached drawings and the following description of the invention.

DESCRIPTION OF THE PREFERRED EMBODIMENTS

According to the present invention, metal cans, can ends, sheet metal or other objects have holographic images or holograms impressed, engraved or embossed in their surfaces by print rolls having the negative of the images impressed in their roll surfaces. The objects that are decorated/embossed in accordance with this invention are preferably made of hard temper aluminum alloys such as 3004 H-19 aluminum. In the case of metal cans, the cans are typically made by drawing a cup and ironing the sidewall of the cup to thin and lengthen the sidewall and make a D&I can body as is well known in the art. The D&I cans produced by such processing usually have a thin wall portion extending for substantially the entire length of the can body except for the top inch or so which is a thick wall portion. In order to be used in commercial packaging, the yield strength of the D&I cans must not be significantly reduced during decoration as can result from heating since the cans must be capable of withstanding the handling and processing involved in filling and closing the cans and to withstand the internal pressures generated by carbonated beverages, beer and other products packaged in the cans.

As used herein, the terms "engrave", "emboss", "transfer" and "impress" mean the transfer of a holographic or a diffraction image from one article or tool to another article or tool by pressing the articles or tools against one another under high pressure. The images are in the form of very small peaks or pits in or on the surface of the objects. The transfer is into the outer surface of the tools and articles.

Cans, sheet metal to be formed into can ends, and other metal products which are engraved/embossed in accordance with this invention preferably have high specularity or brightness in order to produce the desired clarity of the hologram in the surface of the article. This means that the cans and other metal products preferably have a substantially mirror-like surface characterized by having a high distinctness of reflected image ("D/I" for brevity). When a can or other products having a high D/I is positioned adjacent an article or an image or printing on paper or the like, the image or reflection on the can or other metal product should be clear. D/I is the sharpness of the reflected image, and is preferably in a range of at least about 50 to 70% for cans to be engraved/embossed by the method of this invention. High specularity can be produced on the cans, sheet metal and other products in a variety of ways such as burnishing or buffing the exterior surfaces of the cans, sheet metal and other products or by chemically cleaning and etching them. However, D&I body makers produce can bodies having specularity levels, after being washed, which may be high enough for transfer of holograms to the can bodies without further brightening.

Figure 1:
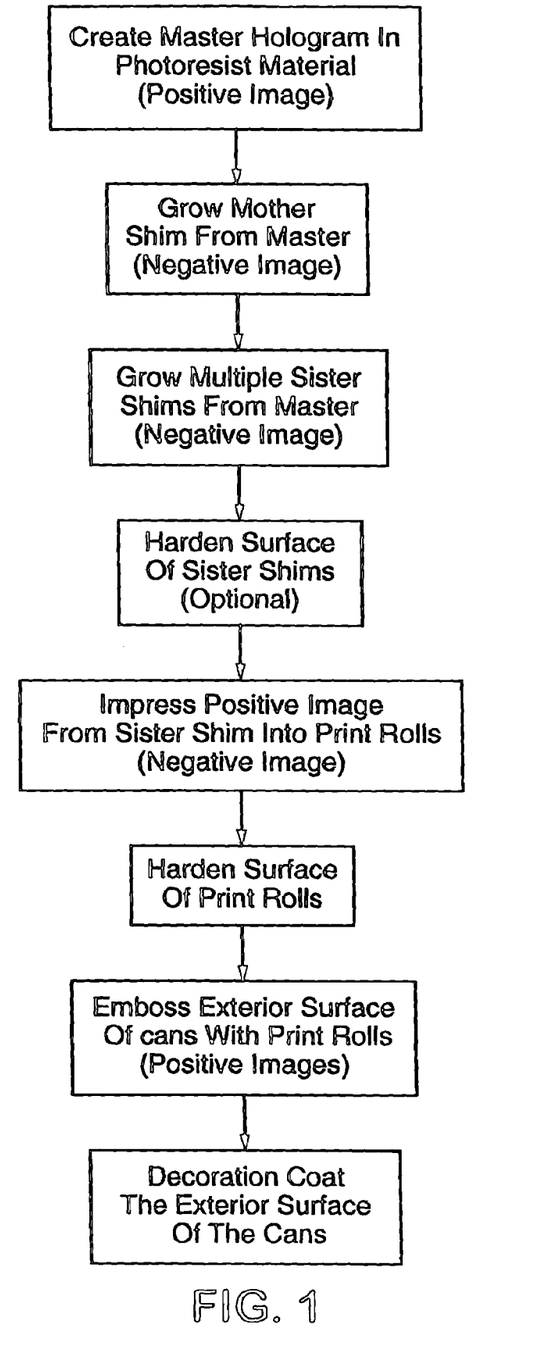
FIG. 1 is a flow diagram showing the steps employed to decorate/emboss aluminum cans with holograms in accordance with this invention.

Referring to the drawings, FIG. 1 outlines a preferred process for engraving/embossing holograms in metal cans and applying a decorative coating to the cans after they have been engraved/embossed. The first step of the process is to create a master hologram as is well known in the art. One common process is to apply a photosensitive coating (photoresist) to a substrate such as glass or metal and to etch the photoresist with two or more coherent beams of light (laser beams) to produce a surface relief pattern (hologram) with a depth corresponding to the intensity of the radiation at each point. The relief grooves or pits that are etched into the photoresist preferably have a maximum depth not greater than the thickness of the photoresist on the substrate. In a preferred embodiment of this invention, the photoresist has a thickness of a least about 3 microns (120 microinches) in order to obtain relief grooves or pits in the hologram in the photoresist that are at least about 2 microns deep, and more preferably at least about 3 microns deep. The relieve grooves may have an aspect ratio of depth to width in a range of about 1:0.5 to 3:1. The master hologram that is produced in the photoresist material is fragile and relatively soft.

The image in the photoresist of the master hologram is a "positive" image. As used herein, a "positive" image means the same image as is desired in the final object. A "negative" image is the inverse of a positive image, like the image in a mirror in which letters/words are reversed. FIG. 1 shows the image in the master hologram as being a positive image, but it could also be created as a negative image in the sense of any letters/words in the image. If the image in the master hologram is created as a negative image with letters/words reversed, then the number of image transfers from master hologram to the final object will be changed by adding or subtracting an odd number of transfers so the letters/words on the final object will be positive. If there are no letters/words in the image, then it may not matter whether the image on the final object is positive or negative.

The next step, which is also well known in the art, is to grow a metal shim or mother shim from the master hologram. This can be done by applying a conductive coating (for example, silver spray) over the photoresist and then immersing the photoresist, i.e., the master hologram, in a bath of metal salts such as nickel salts and electrolytically growing or depositing nickel on the master hologram to generate a negative image of the hologram in a nickel shim. The image on the shim is the inverse of the image on the master hologram in that the grooves in the master hologram produce ridges or peaks on the shim, and also the reverse of the image on the master hologram. The thickness of the metal (nickel) shim varies depending on several factors such as the growing time used. The height of the ridges or peaks on the shim is the same or close to the same depth as the grooves in the photoresist. After the nickel shim has grown to the desired thickness, it is peeled or stripped from the master hologram to expose the negative image in the surface of the mother shim.

The next step in the process is to create multiple shims from the mother shim. It is known in the art to produce 100 or more daughters of the mother shim. This is done by growing daughters of the mother shim (sister shims of each other) in a bath of metal salts in the same manner that the mother shim was grown on the master hologram as described above. In this way many sister shims are grown. A negative image on the mother shim becomes a positive image on each of the sister shims. It is important that the surfaces of the mother shim and the sister shims be as smooth as possible to avoid pressing any imperfections from such surfaces into the hologram images made from the shims. It is also important that the undersurface of the sister shims be smooth. Since the shims are relatively thin, small blemishes on the undersurface of the shims or on surfaces on which the shims are mounted can be transferred through the shims into the holograms produced by the shims.

When the sister shims are grown from the mother, the image on each of the sister shims is the inverse of the image on the mother shim. Thus, ridges or peaks on the mother shim will be grooves or pits in the sister shims. The depth of such grooves or pits are desirably as close to the height of the ridges or peaks on the mother image, but may be considerably less, such as only about 50% of the height of the ridges or peaks, as a result of the transfer process.

Optionally, the hologram surface of the sister shims may be hardened. This can be done in a variety of ways such as ion implantation with a nitrogen plasma and/or by coating the hologram surface with a thin diamond-like carbon (DLC) coating or amorphous diamond coating (ADC) or diamond-like carbon films or carbon nitride coatings. The coatings or films may be formed on the surface of the shims by high temperature chemical vapor deposition (CVD) or enhanced cathodic-arc physical vapor deposition processes that create a high energy flux of carbon ions that are caused to be embedded in the surface of the shim. DLC coatings can also be applied by low temperature physical vapor deposition (PVD) such as cathodic arc deposition of the coating. The physical and mechanical properties of the shim substrate remain substantially unaffected by the coating process, but the coating on the surface has a hardness approaching that of natural diamond. The coating is tightly bonded to the shim substrate and is abrasion resistant. Due to the amorphous nature of the ADC, it requires no post-coat polishing. The coating is continuous and homogeneous and substantially exactly replicates the underlying surface so it does not noticeably degrade the topography of the hologram image. The Tetrabond® Division of Multi-Arc Inc. in Rockaway, N.J. applies TETRABOND)® coatings or other similar coatings on a variety of products for various uses and also supplies equipment for applying such coatings.

It is known that ADC coatings or films may contain high levels of compressive stress. It is believed that the stress levels may be reduced by using a newly developed coating process that uses a pulsed laser on a graphite target at room temperature to produce a high percentage of diamond-like bonds. The coating so produced initially has a high stress level, but heating the coating reduces its stress while retaining its diamond-like properties. The resultant coating is reportedly extremely smooth and more stable than typical diamond films that contain hydrogen. It has been reported that Sandia National Laboratory has filed for a patent on this new process.

The ADC or DLC coating or film is preferably less than about 5000 angstroms thick in order to minimize masking or dulling of the hologram in the surface. ADC coatings may have hardness in a range of about 80–100 Gpa (giga pascal) (8,000–10,000 Vickers), be optically smooth and have a high adherence to the shim substrate. DLC coatings may have hardness in a range of about 10–50 Gpa (1,000–5,000 Vickers). The Gpa hardness measure is used by Multi-Arc Inc., whereas $kg/mm^2$ (kilograms per square millimeter) is used below to measure hardness of shims, metal rolls and cans. Vickers and Rockwell hardness can also be used to measure surface hardness. One $kg/mm^2$ is the equivalent of one $Newton/mm^2$ in the meter-kilogram-second system.

Hardness measurements depend on the nature and size of the indenters, and there are no generally accepted conversion factors from one unit of measurement to another.

The sister shims preferably have a surface hardness of approximately 550–600 kg/mm$^2$, regardless of whether their surface has been hardened as described above. It is important to provide a sufficient surface hardness on the shims to effect a transfer of the hologram image into the surface of a print roll in the next step of the process. It is preferred that effective transfer of a hologram image from the shim to the print roll employ a hardness ratio of the two surfaces of at least about 2.5 to 1 and preferably at least about 2.7 to 1. This means that the surface from which the image is being transferred should be at least about 2.5 times, and preferably at least 4 to 5, harder than the surface into which the image is being impressed.

Figure 2:
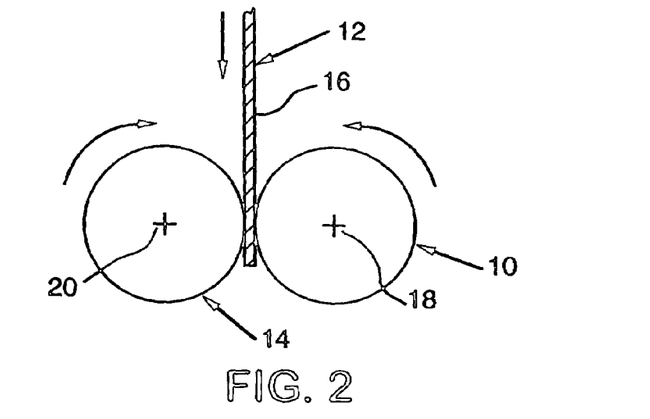
FIG. 2 is a cross-sectional view showing transfer of a hologram image from a shim to a print roll to be used to decorate/emboss cans in accordance with this invention.

The next step in a preferred method of this invention is to transfer the positive image from a sister shim into the surface of a print roll or rolls. This is illustrated in FIG. 2. The support rolls are preferably polished aluminum, steel or other hard metal cylinders made from an aluminum alloy such as 6061, 7075 or other 6000 and 7000 series aluminum alloys, or steel alloys such as 4140, 1018, 1045 and mold steel alloys, and have surface hardnesses of about 110–125 kg/mm$^2$. Print rolls made of 2024 or 4045 aluminum alloys, or other lower yield strength aluminum alloys or other softer, lower strength metals, may also be suitable for some applications. However, print rolls made of higher yield strength alloys, such as 7075 aluminum alloy and 4140, 1018, 1045 and mold steel alloys, appear to be more robust and capable of more cycles of operation than rolls made of lower yield strength alloys. The print rolls may also be steel with metalized coatings, such as metalized aluminum, on them.

The print rolls are preferably either acid or alkaline cleaned and then polished, buffed or bright dipped before the hologram is pressed into their surface. A variety of known mechanical (such as polishing with an orbital sander) and/or chemical processes may be used to provide a smooth, bright finish on the print rolls. A bright finish on the print rolls is beneficial for transfer of a hologram image to the print roll and perhaps even more beneficial for transfer of the image to can bodies. Each print roll may have a diameter that is close or equal to the diameter of the cans which are to be engraved by the print rolls, or may have a diameter that is larger or smaller than the diameter of the cans. A typical 12 oz. aluminum can has a diameter of approximately 2.6 inches, and the print rolls in one embodiment of this invention have diameters of about 2.6 inches. Such roll diameter is also convenient for mounting the rolls in commercial can decoration apparatus as will be described.

It is also believed that the yield strength of the print roll substrate under the surface coating affects the quality of image transfer onto the surface of cans. If the underlying substrate metal in the print roll has a low yield strength, the metal may not provide sufficient support for the hardened surface of the print roll under the pressures required to make the transfer. It is therefore believed that the high yield strength aluminum alloys such as 6000 and 7000 series alloys and certain steel alloys are beneficial to making a good image transfer. It is noted that in the use of such rolls to transfer images to thousands of cans, little or no spalling or flaking of the ADC coatings from the rolls has occurred or been observed.

Each print roll 10 may have a length approximately equal to the length or sidewall height of the thin wall portion of the cans to be embossed. Again a typical 12 oz. can has a thin wall height of about 3.0 inches, so the print rolls are also preferably about 3.0 inches in length.

Each sister shim 12 having a hologram image on it is also preferably sized to correspond to the size of the surface area of cans to be embossed and the print rolls. For example, in one preferred embodiment, about 8.168 inches of can sidewall circumference and 3 inches of can wall height is embossed. Thus, the shim 12 is preferably about 8.168 inches by about 3 inches. However, the diameter and length of the print rolls is not critical to this invention.

As shown in FIG. 2, the shim 12 is pressed against the bright finished (mirror-like finish) print roll 10 by a support roll 14. The image 16 on the shim 12 faces the print roll so the hologram image will be pressed into the surface of the print roll. The support roll 14 has a smooth surface to avoid impressing blemishes from the roll through the shim and into the print roll. As stated above, the surface hardness of the print rolls is preferably approximately 110–125 kg/MM$^2$.

It is important that the axes 18 and 20 of the print roll 10 and support roll 14 are substantially parallel and that the rolls are as round in cross section as reasonably possible to make a good transfer of the hologram image into the print roll. The linear surfaces of the rolls 10, 14 from end to end should also be straight or preferably slightly crowned to make a good transfer of the image into the print roll. The rolls are rigidly mounted to minimize deflection in the rolls during the image transfer. The rolls are pressed against the shim as it moves between them under a linear pressure of about 1000–2200 pounds per square inch of the contact surface between each roll and the shim. The rolls 10, 14 are rotated as shown by the arrows, and the shim 12 moves through the nip between the rolls. Care must be used to insure that the shim is properly aligned as it passes through the nip between the rolls and to prevent slippage between the shim and print roll.

Following transfer of the holographic image to the print rolls, the surfaces of the rolls are hardened. This can be done by ion implantation or by coating the rolls with ADC or DLC as described above with reference to the sister shims. The ADC or DLC is also believed to be beneficial to reducing oxide or other scum build-up on the print rolls when they are used to emboss cans as described below. The surfaces of the print rolls preferably have a minimum hardness of at least 545 to 600 kg/mm$^2$ after they have been hardened. The surfaces of the print rolls should be at least 2.5 times, and preferably at least about 4 to 5 times, harder than the surface hardness of aluminum cans to be decorated. D&I aluminum cans have surface hardness of about 110–125 kg/mm$^2$ and a surface hardness on the print rolls of at least about 545–600 kg/mm$^2$ is required to make a good transfer of the image into the surface of the cans. For other articles, which may be softer than D&I aluminum cans, the print rolls may have a lower surface hardness down to about 200 kg/mm$^2$.

Figure 3:
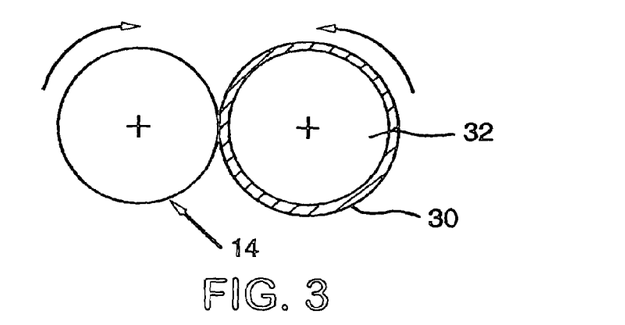
FIG. 3 is a cross-sectional view showing apparatus for transferring/embossing of a hologram image from a print roll into the surface of an aluminum can.
Figure 4:
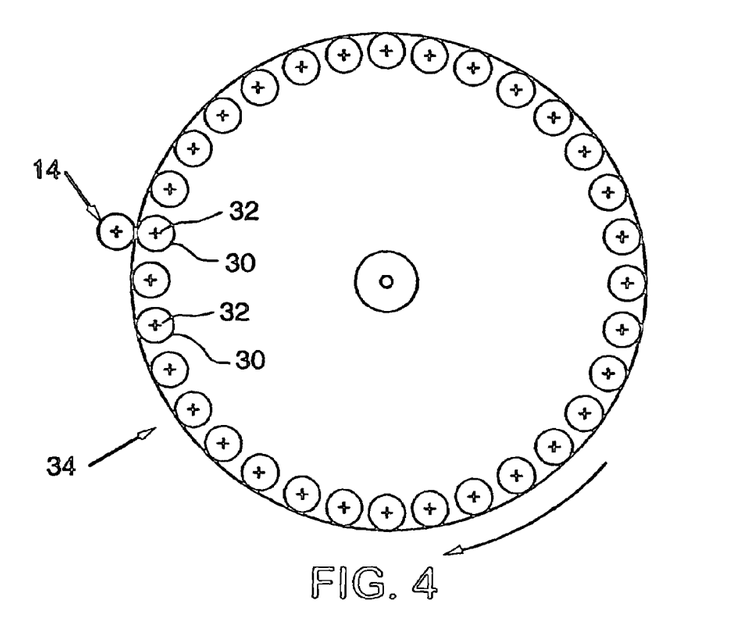
FIG. 4 is a schematic view showing a decorator apparatus having a plurality of mandrels on it for impressing/embossing holograms into can surfaces and applying decorative coatings to the embossed cans.

The next step in the method of this invention is to engrave/emboss the exterior surface of cans as shown in FIGS. 3 and 4. An aluminum can or cans 30 are positioned on a mandrel or mandrels 32 to support the cans against the force of a print roll 14. The print roll 14 is pressed against the surface of the can as the mandrel and the print roll are rotated as indicated by the arrows in FIG. 3. As described above with respect to image transfer from a sister shim to a print roll, the axes of the mandrel and the print roll must be parallel and the linear surfaces from end-to-end of the mandrel and print roll must be as straight as reasonably possible or alternatively have a slight crown on the print roll. The pressure of the print roll against the can surface is preferably about 1000 to 2200 pounds per square inch of contact at the can/print roll interface. The pressure must be sufficient to emboss the holographic image from the print roll into the surface of the can, but should not be so high as to significantly extrude metal in the can sidewall between the print roll 14 and the mandrel 32. Extrusion of metal in the sidewall causes thinning of the sidewall and may deform the can. Only a small amount of thinning of the sidewall is acceptable. The print rolls may be heated slightly up to about 75°–225° to improve transfer of the image into the surface of the cans.

Due to the high pressure required to transfer the holographic image from the print roll to the can and the fact that the mandrel 32 is necessarily a cantilever on which the cup-shaped can is positioned, some deflection of the mandrel is difficult to avoid. Deflection of the mandrel may result in non-uniform pressure of the print roll 14 against the can 30 from one end of the can to the other, and may produce unsatisfactory transfer of the image. Accordingly, supplemental means may be desirable to equalize the transfer pressure along the length of the can. Such supplemental means may comprise applying a greater pressure of the print roll against the can at the unsupported end of the mandrel, angling the axis of the mandrel toward the axis of the print roll so the mandrel is "toed-in" from the base of the mandrel to the unsupported end of the mandrel, or by providing a backup roll or an outboard bearing support for the mandrel/can or the print cylinder if this can be done without significantly degrading the quality of the image on the can. Different pressure profiles on the print cylinder/roll 14 may also be used to reduce the effects of deflection of the mandrel 32 and/or print roll during transfer of the image. For example, the print roll 14 may have a slightly larger diameter mid-length (crown profile) or a tapered profile with a larger diameter at its outer end than at its base to reduce the effects of deflection.

For high volume production of aluminum can bodies and other hard metal products, it may be beneficial to apply a lubricant on the surface of the print rolls or the metal products during transfer of the image from the print roll to the product. The lubricant may be applied to roll 14 shown in FIGS. 3 and 4 or to the can bodies 30 before the print cylinder is pressed against the can bodies. The lubricant may help reduce the production metal fines or other debris during transfer of the image to the can and may also help remove any metal fines or debris which are produced from the surface of the die. Metal fines and/or other debris that may accumulate on the surface of the die may interfere with transfer of the image to the cans, particularly if the same die is used to decorate many thousands or hundreds of thousands of cans. The fines and debris tend to blind the dies or make them less effective in impressing the holographic image into the surface of the cans or other articles.

Lubricant may be applied to the print roll 14 (FIGS. 3 and 4) by a backup flat bar, not shown, covered with a soft fabric. The bar would vibrate in an orbital trajectory that is parallel to the interface between the bar and the print cylinder as the bar is pressed against the print cylinder. Lubricant is applied to the fabric and transferred from the fabric to the print cylinder while debris is removed by the fabric. Lubricant may also be applied to the print roll by spraying the roll with lubricant, such as a fine mist of lubricant.

It is believed that a variety of lubricants or boundary additives to lubricants may be used on the die or cans including such things as fatty acids, fatty alcohols and esters, including oleic acid, stearic acid, methyl stearate and butyl stearate. The quantity of lubricant should be controlled to avoid possible detrimental effects on the cans. For example, excessive quantities of some lubricants may cause dulling or cloudiness on the surface of the cans. It is therefore desirable to carefully meter the lubricant onto the print roll and/or cans. One way of doing this is to use a backup flat bar to which lubricant is supplied to be transferred to the print roll and cans, as is explained above. The position of the backup flat bar can be precisely controlled to limit the amount of lubricant that is carried through the nip between the backup flat bar and the print roll. Metering of lubricant between two rolls in such a manner is well known in the art.

Production apparatus that includes a transfer wheel 34 for transferring holograms from print rolls to drawn and ironed (D&I) can bodies may have a plurality of mandrels 32 for mounting D&I can bodies 30, as is shown in FIG. 4. It is believed that apparatus currently used for applying decorative coatings to can bodies is suitable for engraving/embossing holograms into the surface of cans. U.S. Pat. No. 4,741,266 illustrates and describes such an apparatus for decorating can bodies. The disclosure contained in the patent is incorporated herein by reference. As shown in FIG. 4, the mandrels 32 with D&I can bodies 30 on them are rotated around the transfer wheel 34 and rotated seriatim against the print roll 14 to transfer a hologram image from the print roll onto the surface of the can bodies.

It is noted that the combination of a holographic image and decorative coatings on a can produces an extremely attractive can. The decorative coating may be applied only to the surface of the can which doesn't include the hologram, or may also be applied over all or part of the hologram. The hologram and decorative coating interact to produce an appearance not previously possible in the manufacture of cans.

EXAMPLES

Figure 5:
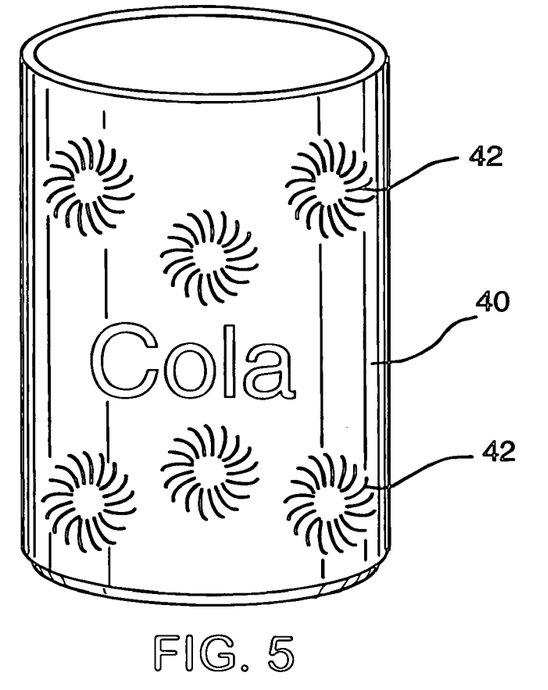
FIG. 5 is a hologram-decorated can that has been decorated/embossed in accordance with this invention.

FIG. 5 shows one example of aluminum can bodies 40 that have been decorated by the method of this invention having a hologram comprising the word "COLA" and a plurality of "galaxies" 42 engraved in or embossed on its surface. The light which reflects off the hologram produces varying looks or images as the can is moved in the light. The hologram image has been transferred to the thin wall portion only of the can bodies to minimize problems with the differential in thickness between the thin wall and thick wall portions of D&I can sidewalls. However, it is believed that this invention may be used to transfer holographic images to both the thin wall and thick wall portions of the can sidewall.

In another application of this invention, two holographic images have been sequentially applied on the exterior surfaces of aluminum cans. One image was a plurality of stars and the other image was a galaxy image similar to that shown in FIG. 5. Some cans were embossed first with the stars followed by the galaxy and others were embossed first with the galaxy image and then the stars.

Figure 6:
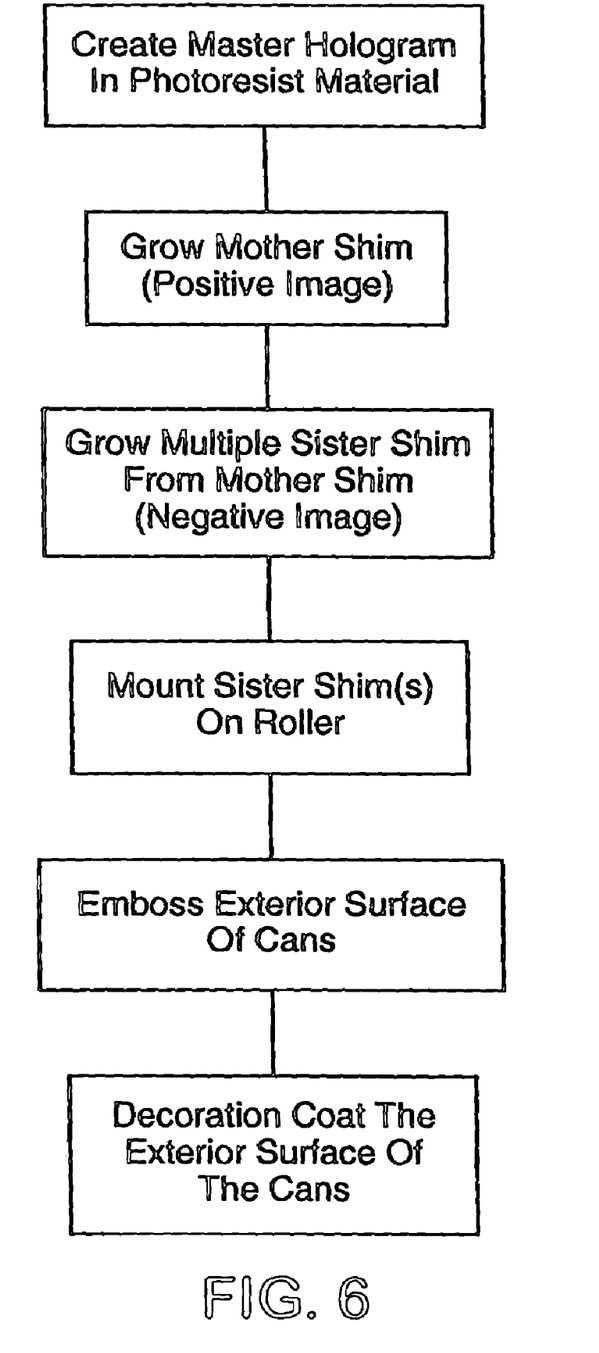
FIG. 6 is a flow diagram showing the steps in an alternative mode for decorating/embossing cans with holograms.

FIG. 6 is a flow diagram of an alternative mode for practicing the invention. In this mode the sister shims are mounted directly on a roller which is used to engrave/emboss the exterior surface of aluminum cans. In this way it is not necessary to first transfer the image from the sister shim to a print roll as in the method of FIG. 1. The sister shims that are mounted on the roller are preferably arcuate in cross-section and fit against the arcuate outer surface of the roller and secured thereto. In one example two such arcuate shims having a curved arc length of about 8 inches were mounted around a roll having a diameter of about 10.4 inches (32 inches in circumference).

The shims in the method of FIG. 6 have negative holographic images on them and press a positive image in the exterior surface of cans. The image in the photoresist material comprises grooves/pits, the image on the mother shim comprises ridges/peaks, the images on the sister shims comprise grooves/pits, and the images in the surface of the cans comprise ridges/peaks. It is important to the method of FIG. 6 that the shims have a surface hardness of at least about 545 to 600 kg/mm$^2$ in order to effectively press a hologram into the surface of aluminum cans having surface hardness of about 110 to 125 kg/mm$^2$. The surface of the shims may be optionally hardened with DLC or ADC as is described above with respect to the method of FIG. 1.

This invention also includes decoration of strip metal and metal end closures for cans. The decoration of such products is similar to the decoration of can bodies. For example, print rolls or metal shims may be used to transfer a holographic image successively into a strip of hard temper aluminum alloy such as 5182 alloy which is then used in the manufacture of end closures as is known in the art as shown for example in U.S. Pat. Nos. 3,191,564 and 3,366,086. The disclosure in those patents is incorporated herein by reference. The invention may also be used to decorate foil such as aluminum foil.

In accordance with this invention, a strip of metal may be fed through the nip between a pair of rolls, one of which is a print roll similar to the print roll 14 in FIG. 3, and the holographic image on the print roll is repeatedly pressed against the strip as the strip moves through the nip. This produces a series of holograms on the strip. The strip can then be converted into end closures, each of which will have a hologram on it, preferably somewhere on the central panel portion of the end closure which is exposed upwardly on the can (public surface) when the end closure is sealed on a can body.

In an alternative mode for practicing this invention, hard temper metal articles such as a disc of 5182 H-19 aluminum alloy may have holographic images impressed into a surface on each article by a die. The die could be a print roll like roll 14 in FIG. 3 or a shim having the holographic image on it. The die preferably has an ADC, DLC or other hard coating on it so the image can be transferred many thousands of times into the articles which may be made of hard temper metal. As with all methods of practicing this invention, it is important that the die have a surface hardness which is at least 2.5 times, and preferably at least 4 to 5 time, harder than the surface to which the image is being transferred. It is also important that the surface of the article being decorated has a substantially mirror-like or high specularity surface in order to produce satisfactory clarity and consistency of the images on the surface of each article.

In one alternative embodiment of the invention, a print roll is used that has a holographic image on only a portion of the circumference of the roll, and has a blank or smooth surface on the remainder of the circumference of the roll, and has a blank or smooth surface on the remainder of the circumference of the roll. The roll preferably has a larger diameter than the can body, and the arc length of the roll having the holographic image on it is approximately the same as the circumference of the can body so the fall circumference of the can will be decorated by the print roll. In the operation of such a print roll, the smooth surface of the roll is first moved against the exterior surface of the can body, followed by rotation of the can body and print roll against one another until the circumference of the can has been decorated. The print roll and can on its mandrel then separate so the decorated can body may be removed from the mandrel. An advantage of this alternative embodiment is that the initial force or impact of the print roll against the can body will not cause excessive digging-in or non-uniform engraving of the surface of the can body by the holographic image on the print cylinder. Instead, the blank/smooth surface of the print cylinder absorbs the impact of bringing the print roll into pressure contact with the can body. This mode of operation also helps to prolong the life of the print cylinder by reducing degradation of the image on the print roll from impact of the roll against the can body.

Figure 7:
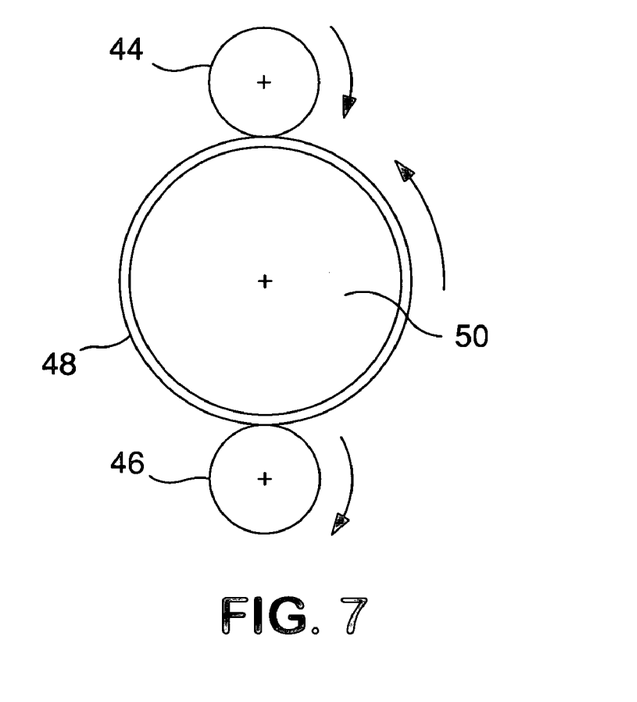
FIGS. 7 and 8 are cross-sectional views showing alternative apparatus and modes for practicing the invention.

Another alternative embodiment of this invention is shown in FIG. 7 in which two print rolls/cylinders 44, 46 are rolled against a can body 48 on a mandrel 50. The print rolls 44, 46 may be smaller in diameter than the can body 48, and each roll decorates one-half of the circumference of the can. This alternative helps reduce deflection of the mandrel 50 because the print rolls support opposite sides of the mandrel 50. The print rolls 44, 46 may also have blank portions on their surfaces for making initial contact with the surface of the can body as is discussed above.

Figure 8:
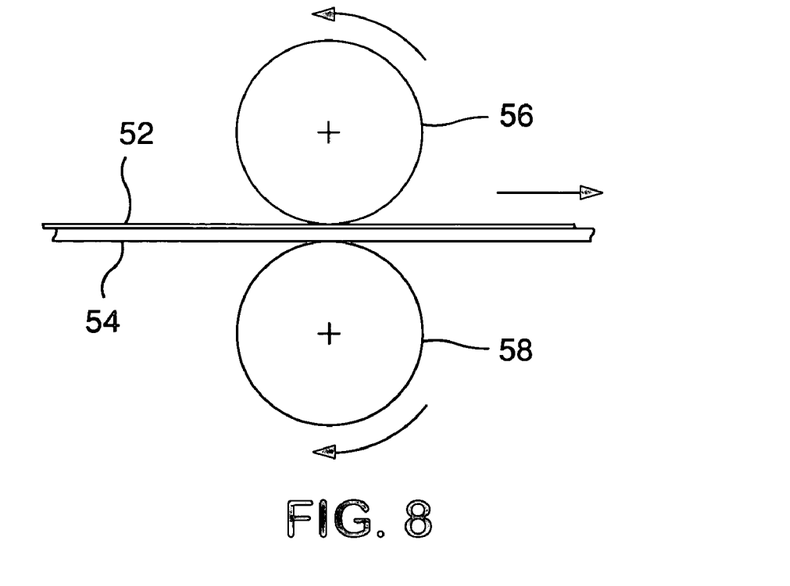

Another embodiment of this invention is shown in FIG. 8 for decorating sheet metal or metal foil. In this embodiment, sheet metal such as foil 52 is supported on a flat support member 54 such as a smooth metal plate. The foil 52 and plate 54 are passed through the bit between a print roll 56 and a backup roll 58 to engrave a holographic image on the print roll into the surface of the foil. In this embodiment, the backup plate provides a flat, smooth surface under the foil so as to enhance transfer of the image into the foil.

In another embodiment of this invention, print rolls are produced and used that have grooves or pits in their surface instead of ridges/peaks on the surface. One of the problems in producing holographic images on hard metal objects, such as can bodies or sheet metal, is producing consistently high quality images in high volume production. Achieving this is greatly facilitated by the use of high quality print rolls. It has been found that transfer of holographic images from a photoresist coated plate, to a mother shim, to sister shims and print rolls results in progressively shallower grooves/pits and ridges/peaks in each transfer. For example, transfer of an image from a sister shim to a print roll may be only about 50% effective. This means the ridges on the print roll will be only about 50% as high as the depth of the grooves in the sister shim. The transfer from the print roll to the hard metal cans or other objects may also be only about 50% effective. It is especially desirable to improve the transfer of the holographic image from a shim to a print roll. Accordingly, in one alternative invention, a shim having ridges/peaks, instead of grooves, on the surface is used to transfer the holographic image to the print roll. This produces an improved print roll for use in decorating metal objects in accordance with this invention.

Whereas particular embodiments of this invention have been described for purposes of illustration, it will be evident to those skilled in the art that numerous variations in details may be made without departing from the invention as covered by the appended claims. For example, the method of this invention can be used to emboss/engrave holograms on a variety of products such as polished metal sheet (preferably aluminum) or other articles of manufacture. Such products include automotive trim, tool boxes, truck panels, desks, key chains, credit cards, business cards, metal foil and decorative wall coverings. Some such products may have surface hardnesses in a range of about 50 to 150 kg/mm$^2$. It is also possible to modify this invention by embossing cans directly from the shims instead of first transferring the hologram to a print roll. In that alternative, a can is mounted on a mandrel and rotated as a shim having a hologram on it is pressed against the can by a supporting roll in a manner similar to that shown in FIG. 2. The shim could also be arcuate in shape to conform to the arcuate surface of the support roll. Such an arcuate shaped shim may be attached to and be rotated with the support roll.

Shims used with this invention may also be prestressed or alternatively stress relieved to reduce squirming or movement of the edges of the shims during transfer of images to a print roll or other objects. The edges of the shims may also be supported by a backup roll to reduce such squirming of the edges.

Print rolls used in this invention can also vary in diameter and may be smaller, the same as, or larger in diameter than the can bodies being embossed. The ADC or DLC coatings on print rolls and/or shims may also vary in thickness down to about 1,000 angstroms although they are preferably about 2,000–3,000 angstroms thick. The cans, can ends or other products that may be decorated in accordance with this invention may also have a thin, clear coating of polymer such as polyester on them, and the holographic image may be transferred to such coating that is similar to image transfer to credit cards or the like, although with less clarity of the image as compared with transfer of images into bare metal. Other modifications to the invention falling within the scope of the appended claims will be apparent to those skilled in the art.

We claim:

1. A method of applying a holographic image to the surface of an article made of hard temper metal comprising:
   providing a photoresist coated plate,
   etching a holographic pattern in the photoresist with said pattern etched to a depth of at least about 2–3 microns in the photoresist,
   growing a mother shim on said photoresist with said pattern in it from said photoresist,
   transferring said pattern from the mother shim to multiple sister shims,
   pressing at least one of said sister shims against a die having a surface hardness of at least about 110–125 kg/mm$^2$ to transfer said pattern from said at least one sister shim to said die surface,
   hardening the surface of said die by a process selected from ion implantation and coating the surface with diamond-like carbon, amorphous diamond coating or carbon nitride to a surface hardness of at least about 545 kg/mm$^2$, and
   providing a metal article to be impressed with said holographic image, said article having a surface hardness of at least about 50 kg/mm$^2$, and
   pressing said die against a surface on said metal article to transfer said holographic image into a surface on said metal article.

2. A method as set forth in claim 1 in which said die is applied seriatim against the surface of a succession of said metal articles.

3. A method as set forth in claim 1 in which lubricant is sprayed on the surface of at least one of said die and said article to reduce or eliminate buildup of debris on the surface of said die.

4. A method as set forth in claim 1 in which said die is a print cylinder made of hard temper aluminum alloy.

5. A method as set forth in claim 1 in which said article is a hard temper aluminum alloy can body.

6. A method as set forth in claim 1 in which said article is a strip of hard temper aluminum alloy sheet metal and said method includes forming aluminum end closures from said strip of sheet metal after a series of said holographic image has been transferred into a surface on the strip of sheet metal.

7. A method for producing a die for use in impressing a holographic image many times into strip material or numerous articles comprising:
   providing a photoresist coated plate,
   etching a holographic pattern in the photoresist,
   growing a mother shim with said pattern in it from said plate,
   pressing said mother shim against a sister shim to transfer said pattern to the sister shim, and pressing the sister shim against a metal die to transfer said pattern to said metal die, and coating at least a portion of said die bearing said holographic image with a diamond-like coating.

8. A method as set forth in claim 7 in which said coating is an amorphous diamond-like coating.

9. A method as set forth in claim 7 in which said holographic pattern is etched in said photoresist coating to a depth of at least about 3 microns.

10. A method as set forth in claim 7 in which said coating has a thickness less than about 5000 angstroms and a hardness of at least about 80 Gpa.

11. A method as set forth in claim 7 in which said die is a cylinder made of hard metal and said holographic image is formed in the surface of said metal cyUnder.

12. A method as set forth in claim 7 in which said pattern in said metal die comprises pits in the surface of the die.

13. A method as set forth in claim 7 in which said pattern in said mother shim is transferred to at least one sister shim and from said sister shim to said metal die.

14. A method of applying a holographic image to the surface of hard temper aluminum drawn can bodies comprising:
   providing at least one cylindrical print cylinder having a holographic image pressed in its surface around a portion of the circumference of the print cylinder and a smooth surface around the remainder of the circumference of the print cylinder,
   providing a hard temper aluminum can body having a longitudinal axis parallel with the longitudinal axis of said at least print cylinder,
   moving at least one of said at least one print cylinder and said can body toward the other to press said smooth surface on the print cylinder against said can body under substantial interfacial pressure, and
   rotating at least one of said can body and said at least one print cylinder on its longitudinal axis while maintaining said substantial interfacial pressure to transfer said image from said print cylinder to the surface of said can body.

15. A method as set forth in claim 14 which includes pressing two of said print cylinders against said can body on substantially opposite sides of the can body.

16. A method as set forth in claim 15 in which said two print cylinders each have a portion of a holographic image that is transferred to said can body and each cylinder rotates against a separate portion of the can body.

17. A method as set forth in claim 14 in which said print cylinder is mounted as a cantilever and a bearing support is provided for the end of said cantilever to reduce deflection of the cantilever.

18. A method as set forth in claim 14 in which said print cylinder has a diameter larger than said can body, and the portion of the circumference of said print cylinder bearing said holographic image is approximately equal to the circumference of said can body.

19. A method as set forth in claim 14 in which said holographic image in said print cylinder comprises pits/grooves in the surface of the cylinder.

20. A method of applying a holographic image to the surface of sheet metal comprising:

supporting said sheet metal against a flat plate member, and passing said sheet metal on said plate member through a bite between a turning print cylinder having a holographic image pressed in its surface and a turning backup roll with the sheet metal product moving against said holographic image on the print cylinder to impress the image into the surface of the sheet metal.

21. A method as set forth in claim 20 in which said holographic image on said print cylinder comprises pits/grooves in the surface of the print cylinder.

22. A method as set forth in claim 20 in which said sheet metal comprises foil.

23. A method as set forth in claim 22 in which said foil is aluminum foil.

* * * * *